United States Patent [19]

Kelleher et al.

[11] Patent Number: 5,005,234
[45] Date of Patent: Apr. 9, 1991

[54] INFANT CAR BED FOR A VEHICLE

[75] Inventors: Barbara J. Kelleher; Michael J. Walsh, both of Buffalo, N.Y.; Richard E. Cone, Dayton, Ohio

[73] Assignee: Hartley Associates Inc., Buffalo, N.Y.

[21] Appl. No.: 356,750

[22] Filed: May 24, 1989

[51] Int. Cl.⁵ .............................................. A47D 7/04
[52] U.S. Cl. .............................................. 5/94; 5/97
[58] Field of Search ............... 5/94, 97, 118, 424; 297/216

[56] References Cited

U.S. PATENT DOCUMENTS

| | | | |
|---|---|---|---|
| 3,003,164 | 10/1961 | Calveledge | 5/94 X |
| 3,159,850 | 12/1964 | Aldrich et al. | 5/94 |
| 3,619,825 | 11/1971 | Taub et al. | 5/94 |
| 3,767,259 | 10/1973 | Blake et al. | 297/216 X |
| 3,833,946 | 9/1974 | Von Wimmersperg | 5/94 |
| 4,366,587 | 1/1983 | Takada | 5/94 |
| 4,481,685 | 11/1984 | Watson | 5/94 |
| 4,501,032 | 2/1985 | Heath et al. | 5/94 |
| 4,583,253 | 4/1986 | Hall | 5/94 |
| 4,681,368 | 7/1987 | Heath et al. | 297/250 |
| 4,827,542 | 5/1989 | Kurtenbach | 5/94 X |

Primary Examiner—Michael F. Trettel
Attorney, Agent, or Firm—Robert P. Simpson; Michael L. Dunn

[57] ABSTRACT

An infant car bed for a vehicle is provided which is particularly suitable for the transport of premature or physically disabled infants. The car bed includes an "L" shaped base member adapted to hold an apnea monitor and secured by a vehicle seat belt on a forward facing or rearward facing seat such that the base of the "L" shaped base member rests upon the seat and the vertical leg portion of the "L" shaped base member is proximate the back of the seat. A bed member having a webbed top cover is povitally secured to the upper portion of the vertical leg portion of the base member at a point above the center of gravity of the bed member.

10 Claims, 3 Drawing Sheets

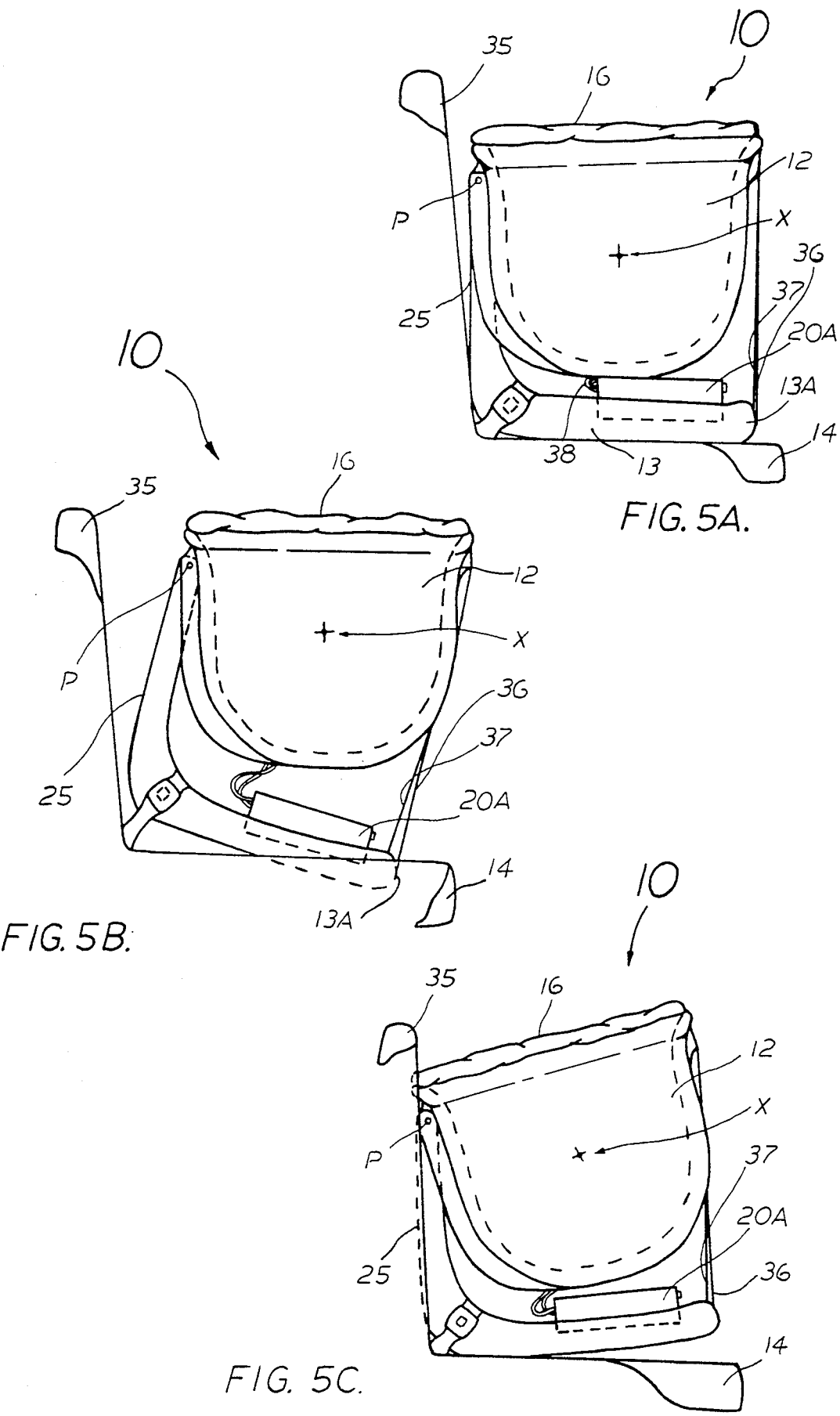

INFANT CAR BED FOR A VEHICLE

Field of the Invention

The present invention relates to an infant car bed, and more particularly, to a car bed for premature or physically disabled infants.

BACKGROUND OF THE INVENTION

It is a universally accepted fact that the proper use of well designed infant and child restraint systems can significantly decrease the risk of death and serious injury in motor vehicle crashes involving normal children. A variety of both infant and child car seats and car beds are commercially available and the art includes several United States patents as well, see, e.g., Heath, U.S. Pat. No. 4,681,368, *Child Restraint Bassinet*, July 21, 1987; Heath, U.S. Pat. No. 4,501,032, *Child Restraint Bassinet*, Feb. 26, 1985; Watson, U.S. Pat. No. 4,481,685, *Bassinet Restraint For Infants*, Nov. 13, 1984; Takada, U.S. Pat. No. 4,366,587, *Infant Safety Carrier For Vehicles*, Jan. 4, 1983; Von Wimmersperg, U.S. Pat. No. 3,833,946, Sept. 10, 1974.

Unfortunately, the prior art does not address the special problem of transporting premature or physically disabled infants. For example, when premature infants are placed in semi-reclined infant safety seats, there is a potential for respiratory compromise. It has been suggested that parents of premature infants should be warned of the risks of auto travel when oxygen desaturation can occur and advised to travel as little as possible for the first few months of the infant's life. American Academy of Pediatrics, *Transporting Children With Special Needs*, Safe Ride News, Volume VI, Nos. 2 & 3. In view of the recent trend in medical care which encourages early discharge of premature infants from the hospital, it is often necessary to transport premature babies to and from the hospital for medical monitoring and attention.

In addition to the problem of transporting premature infants in presently available infant safety seats, many physically handicapped and other medically fragile infants are unable to travel in a semi-reclined position for a variety of reasons (spica casts, spinal cord injuries, degenerative neurological diseases, injuries requiring orthopedic appliances, etc.).

Thus, there exists an immediate need for a car bed for premature and physically disabled infants to allow them to be transported in either a prone or supine position while affording the same or a superior level of crash protection to that offered by conventional infant safety seats. The improved car bed must also demonstrate compliance with the performance evaluation criteria of Federal Motor Vehicle Safety Standard No. 213 (FMVSS 213)—Child Restraint Systems, and should preferably also be suitable for use by normal, premature, and physically disabled infants.

SUMMARY OF THE INVENTION

A means for protecting a child horizontally disposed in a vehicle is provided which is particularly suitable for the transport of premature or physically disabled infants. The means comprises a cushioned bassinet and means for attaching the bassinet to the vehicle in a horizontal position which reduces impact effect of inertial forces and inhibits rotation of the bassinet with respect to the vehicle. In one embodiment, the car bed includes an "L" shaped base member adapted to be secured by a vehicle seat belt on a forward facing or rearward facing seat such that the base of the "L" shaped base member rests upon the seat and the vertical leg portion of the "L" shaped base member is proximate the back of the seat. A bed member having a webbed top cover is pivotally secured to the upper portion of the vertical leg portion of the base member at a point above the center of gravity of the bed member.

The invention also includes a method of protecting a child horizontal in a vehicle, said method comprising placing the child in a cushioned bassinet, which bassinet is attached to the vehicle in a horizontally disposed position by means which reduces impact effect of inertial forces and inhibits rotation of the bassinet with respect to the vehicle.

Accordingly, a primary object of the present invention is to provide a car bed for a vehicle for safely transporting normal, premature, and physically disabled infants.

A further object of the invention is to .de a car bed for infants which provides a pivoting for maximum protection in the event of a collision.

Another object of the invention is to a car bed for infants which maintains the infant in a horizontal orientation in the event of a crash.

Yet another object of the invention is to provide a car bed for infants which is adapted to contain an apnea monitor.

Still a further object of the invention is to provide a car bed for infants in compliance with Federal Motor Vehicle Safety Standard No. 213 (FMVSS 213)—Child Restraint Systems.

These and other objects will be readily appreciated by an understanding of the following written description of the invention, taken in conjunction with the figures of the accompanying drawings.

BRIEF DESCRIPTION OF THE DRAWINGS

FIG. 5A illustrates the invention with the bed member in its normal position on a car seat.

FIG. 5B illustrates the position of the car bed at an instant in time during a front-end collision.

FIG. 5C illustrates the position of the car bed at an instant in time just after a front-end collision.

DETAILED DESCRIPTION OF THE INVENTION

The infant car bed 10 shown in FIGS. 1 to 5 of the drawings comprises a bed member 11 which includes bassinet 12, which is preferably molded from a high-impact strength plastic, and "L" shaped base member 13, which is also constructed of high-impact strength plastic. In a preferred embodiment, base member 13 is constructed of a flexible plastic material capable of bending.

Figure 1:
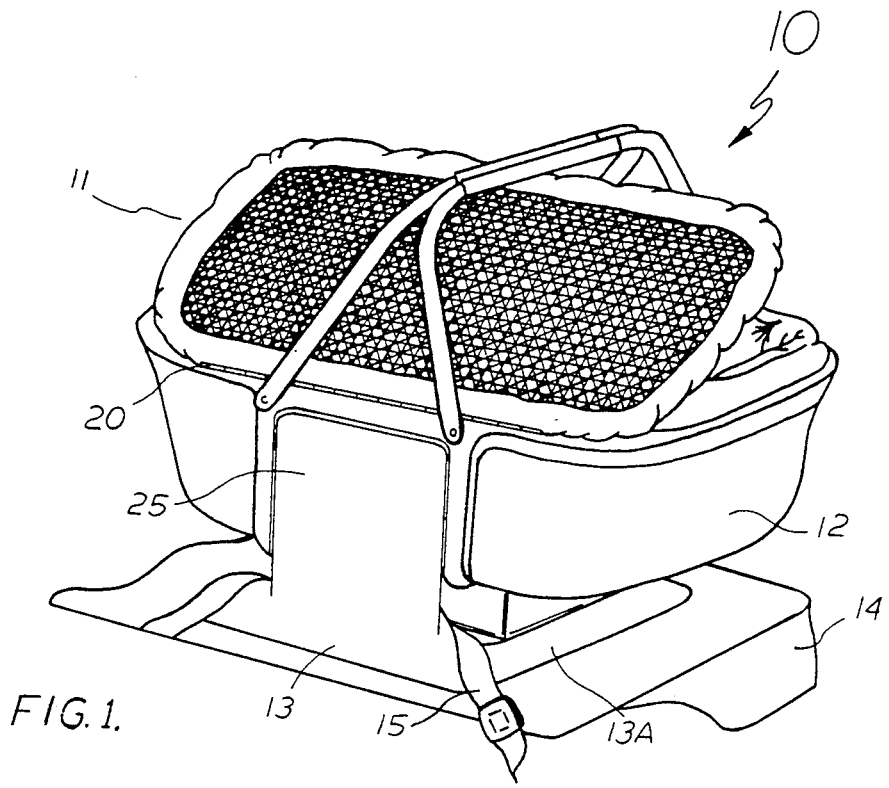
FIG. 1 is a rear perspective view of the invention showing the car bed positioned crosswise across a car seat with the back of the seat cut away.

FIG. 1 is a rear perspective view of car bed 10 showing the bed positioned crosswise across car seat 14 with the back of the car seat cut away. Seat belt 15 wraps around the junction of base 13A and vertical leg portion 25 of "L" shaped member 13 to hold car bed 10. In practice, the seat belt should be adjusted as tightly as possible.

Figure 2:
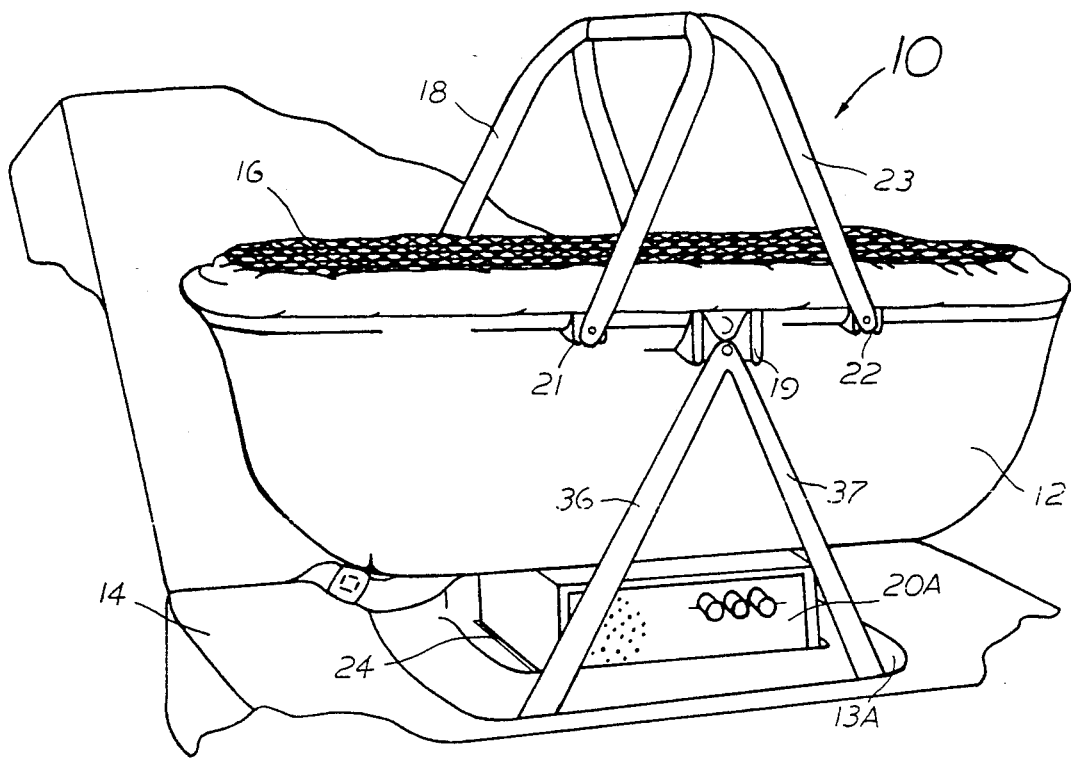
FIG. 2 is a front perspective view of the infant car bed showing an apnea monitor mounted beneath the bed.

As shown in FIG. 2, bassinet 12 is of a generally tub-like shape and is of a size sufficient to hold either a normal or premature infant. Although not shown in the drawings, the interior of bassinet 12 contains soft pliable cushion material to protect the infant during transport. For example, in a preferred embodiment, bassinet 12 may contain energy-absorbing flexible foam such as polyurethane which is shaped to nest within the bassinet. Webbed top cover 16 which is secured to bassinet 12 by hinge 20 (as shown in FIG. 1) and latched to the bassinet by latch 19, permits ventilation and also functions to restrain the infant in the event of a crash. Carrying handles 18 and 23 are secured to bassinet 12 at pivots 21 and 22, respectively, and provide carrying means for carrying the car bed outside of the vehicle. Base 13A of "L" shaped base member 13 rests upon car seat 14 and includes a hollowed out, generally rectangular area 24 adapted to hold a conventional apnea monitor, such as monitor 20A. Monitor 20A is connected to sensors which monitor various physiological conditions of the infant via cables 38 (shown in FIG. 5) which enter bassinet 12 through holes (not shown) in the bottom of the bassinet. Base 13A is adapted to hold a variety of commercially available apnea monitors. Elastic supports 36 and 37 extend from base 13A to latch 19, and function to maintain bassinet 12 in a generally horizontal orientation during a crash, as better illustrated in FIGS. 5A–5C. Supports 36 and 37 are secured to base 13A and are removably secured to latch 19.

Figure 3:
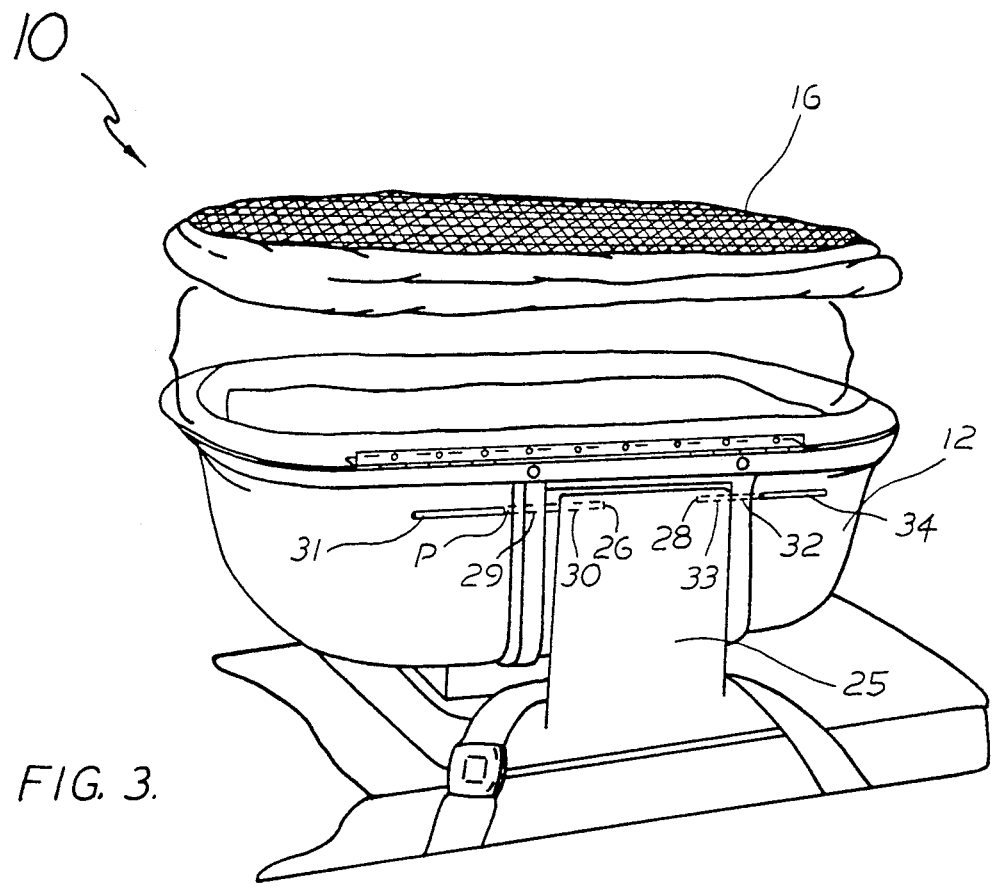
FIG. 3 is a rear perspective partially exploded view of the car bed showing the hinged top cover removed and also showing the "L" shaped base member which is pivotally secured to the bed member.

FIG. 3 is a rear partially exploded perspective view of car bed 10 showing hinged top cover 16 removed. Carrying handles 18 and 23 have also been removed from the figure for purposes of illustrating the pivotal action of the bed. The upper portion of vertical leg portion 25 of "L" shaped base member 13 includes pivot mounting assemblies 26 and 28. Mounting assembly 26 includes through-bore 29 in the rear wall of bassinet 12, partial through-bore 30 in vertical leg 25, and pivot pin 31. Similarly, mounting assembly 28 includes through-bore 32 in the rear wall of bassinet 12, partial through-bore 33 in vertical leg 25, and pivot pin 34. Pivot mounting assemblies 26 and 28 function to pivotally secure bed member 11 to "L" shaped member 13.

Figure 4:
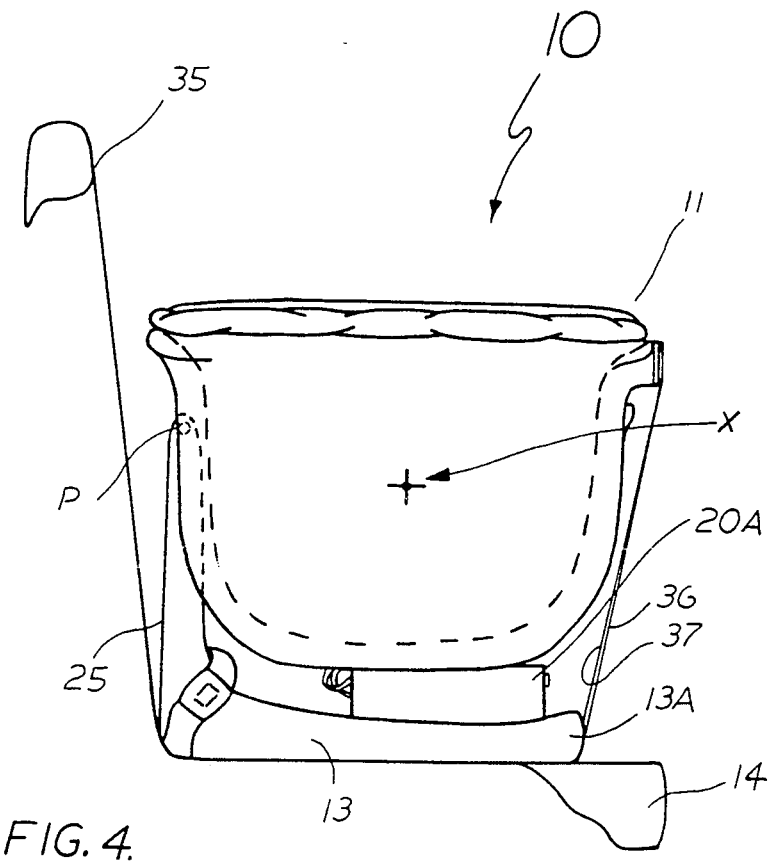
FIG. 4 is a side partial sectional view showing pivot point "P" above the center of gravity "X" of the bed member.

FIG. 4 is a side partial sectional view of car bed 10 showing its relative position on car seat 14. Once again, the carrying handles have been removed to simplify the drawing. Vertical leg portion 25 of "L" shaped base member 13 is proximate back 35 of car seat 14. FIG. 4 clearly shows a critical aspect of the invention, i.e., that center of gravity "X" of bed member 11 is below pivot point "P" corresponding to pivot mounting assemblies 26 and 28. This relationship between the pivot point and center of gravity causes bed member 11 to pivot or rotate as shown in FIGS. 5A–5C in the event of a frontal crash, thereby ensuring maximum protection and safety of the infant.

FIGS. 5A–5C illustrate operation of the car bed during various stages of a front-end collision. FIG. 5A shows bassinet 12 in a relatively horizontal position, held in place by the interaction of gravity and further secured by elastic supports 36 and 37. This is the normal position of the car bed during transport. At rest, gravitational forces cause bassinet 12 to pivot downwardly (clockwise) until its rear exterior wall comes into contact with vertical leg 25 of base member 13. This contact prevents bassinet 12 from further rotation about pivot point "P" and causes the bassinet to maintain a horizontal position parallel to base 14 of the car seat and also parallel to the ground. Of course, as the vehicle moves over uneven roads, the inertia of bassinet 12 will urge it to pivot upwardly (counterclockwise) from time to time, as, for example, when the car traverses a bump in the road. Elastic supports 36 and 37 prevent counterclockwise rotation of bassinet 12, however, and function to maintain the car bed in a horizontal position. As shown in the drawing, cables 38 extend from apnea monitor 20A through a hole (not shown) in the bottom of bassinet 12, and connect to sensors attached to the infant.

FIG. 5B illustrates the position of the car bed at an instant in time during a front-end collision. Forward inertia urges bassinet 12 to move away from seat back 35 and also causes vertical leg 25 of base member 13 to move away from seat back 35. Pivot point "P" and elastic supports 36 and 37 interact to maintain the bassinet in a relatively horizontal orientation, ensuring the safety of the infant. As shown in the figure, elastic supports 36 and 37 stretch during a crash, i.e., they are shown as having greater lengths than in pre-crash FIG. 5A. Also, base 13A compresses the cushion of car seat 14. As an additional safety measure, "L" shaped member 13 may undergo elastic or plastic deformation during a severe crash. A severe crash will cause a bending of base member 13 such that vertical leg section 25 forms an acute angle with respect to base 13A of member 13. The amount of bending is a function of the crash severity, the strength of material used to form the base member, and the dimensions of the base member. However, one having ordinary skill in the art to which this invention pertains can readily manufacture a base member that will have elastic deformation for crashes at approximately 15 to 20 mph and plastic deformation at approximately 25 to 30 mph (and above). As shown in FIG. 5B, the bending of member 13 during a crash can aid in maintaining horizontal stability of bassinet 12.

FIG. 5C illustrates the position of the car bed at an instant in time just after a front-end collision. Base member 13 has rebounded or bounced back after initial impact so as to compress the cushion of seat back 35. Elastic supports 36 and 37 prevent bassinet 12 from rotating counterclockwise, thereby ensuring horizontal stability.

A consideration of the above-described embodiment will indicate that the invention is very simple but nevertheless results in significant improvement to an infant car bed for premature infants. It will be understood that the foregoing embodiment is illustrative of the invention and should not be considered as limiting and that other embodiments of the invention are possible without departing from the invention's spirit and scope. For example, although FIGS. 1–5 depict the car bed on a forward-facing seat with the front of the car to the right of the figure, the bed will also function to protect the infant when placed on a rearward-facing seat. Also, although the above description has emphasized operation of the invention during a front-end crash, it is readily appreciated that the car bed also provides maximum safety for the infant during a rear-end collision, and a significant amount of protection during any collision. It should also be understood that the present invention will function properly with any Type 1 or Type 2 restraining belt system including both automatic locking retractors and emergency locking retractors.

What is claimed is:

1. An infant car bed for a vehicle comprising:
    an "L" shaped base member having a base and a vertical leg portion, said base member adapted to be secured by a vehicle seat belt on a forward facing or rearward facing seat such that the base of said "L" shaped base member rests upon the seat and the vertical leg portion of said "L" shaped base member is proximate the back of the seat, said base having a pivot mounting assembly within an upper portion of the vertical leg portion of said "L" shaped base member;
    a bed member comprising a bassinet having a webbed top cover, said bassinet adapted to be pivotally secured to said base member by said pivot mounting assembly at a point above the center of gravity of said bed member; and
    an electric strap secured between said base member and a front edge of said bassinet to inhibit rotation of said bassinet.

2. An infant car bed for a vehicle as recited in claim 1 wherein said "L" shaped base member is adapted to hold an apnea monitor.

3. An infant car bed for a vehicle as recited in claim 1 and including carrying means secured to said bassinet for the purpose of carrying the car bed outside said vehicle.

4. An infant car bed for a vehicle as recited in claim 1 wherein said "L" shaped base member is constructed of a flexible material capable of bending.

5. A method of protecting a child horizontally disposed in a vehicle which comprises securing the car bed of claim 1 to a front or rear facing seat of the vehicle by a seat belt and placing the child in said bassinet.

6. An infant car bed as recited in claim 1 wherein said "L" shaped base member is flexible and will undergo elastic deformation during a crash at approximately 15 to 20 miles per hour.

7. An infant car bed as recited in claim 1 wherein said "L" shaped base member is flexible and will undergo plastic deformation during a crash at approximately 25 to 30 miles per hour and above.

8. Apparatus for protecting an infant in a vehicle, comprising:
    a cushioned bassinet for holding said infant, and
    means for supporting said bassinet in a horizontal position comprising a flexible base member secured to a seat of said vehicle, wherein said bassinet is pivotally mounted to said support means, and also including an elastic strap extending between said base member and a front edge of said bassinet, wherein said flexible base member and said elastic strap jointly function to protect said infant in event of a collision of said vehicle by minimizing impact effects of inertial forces and inhibiting rotation of said bassinet.

9. Apparatus for protecting an infant in a vehicle as recited in claim 8 wherein said flexible base member will undergo elastic deformation during a crash at approximately 15 to 20 miles per hour.

10. Apparatus for protecting an infant in a vehicle as recited in claim 8 wherein said flexible base member will undergo plastic deformation during a crash at approximately 25 to 30 miles per hour and above.

* * * * *

UNITED STATES PATENT AND TRADEMARK OFFICE
CERTIFICATE OF CORRECTION

PATENT NO. : 5,005,234

DATED : April 9, 1991

INVENTOR(S) : Barbara J. Kelleher, Michael J. Walsh, Richard E. Cone

It is certified that error appears in the above-identified patent and that said Letters Patent is hereby corrected as shown below:

Column 5, Claim 1 line 28, "electric strap" should be replaced with --elastic strap--.

Signed and Sealed this

Twenty-second Day of September, 1992

Attest:

DOUGLAS B. COMER

*Attesting Officer*   *Acting Commissioner of Patents and Trademarks*